(12) United States Patent
Honda

(10) Patent No.: US 9,005,807 B2
(45) Date of Patent: Apr. 14, 2015

(54) CURRENT COLLECTOR FOR BIPOLAR SECONDARY BATTERY

(75) Inventor: Takashi Honda, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 630 days.

(21) Appl. No.: 13/501,161

(22) PCT Filed: Nov. 4, 2010

(86) PCT No.: PCT/JP2010/069610
§ 371 (c)(1),
(2), (4) Date: Apr. 10, 2012

(87) PCT Pub. No.: WO2011/062065
PCT Pub. Date: May 26, 2011

(65) Prior Publication Data
US 2012/0208082 A1  Aug. 16, 2012

(30) Foreign Application Priority Data

Nov. 20, 2009  (JP) ................................. 2009-265181

(51) Int. Cl.
*H01M 4/64* (2006.01)
*H01M 4/66* (2006.01)
*H01M 10/02* (2006.01)
*H01M 4/60* (2006.01)

(52) U.S. Cl.
CPC  *H01M 4/60* (2013.01); *H01M 4/66* (2013.01); *H01M 4/667* (2013.01)

(58) Field of Classification Search
CPC ......... H01M 4/60; H01M 4/66; H01M 4/667; H01M 2004/029; H01M 10/044; H01M 10/0418; H01M 10/127; H01M 10/18; H01M 10/282

See application file for complete search history.

(56) References Cited

U.S. PATENT DOCUMENTS

2008/0220330 A1   9/2008  Hosaka et al.

FOREIGN PATENT DOCUMENTS

| CN | 101286576 A | 10/2008 |
|---|---|---|
| EP | 1986250 A1 | 10/2008 |
| JP | 62-55870 | 3/1987 |
| JP | 62-100945 | 5/1987 |
| JP | 10-50294 | 2/1998 |
| JP | 2006-190649 | 7/2006 |

OTHER PUBLICATIONS

An English translation of the Russian Office Action for the corresponding Russian patent application No. 2012125618 issued on Sep. 12, 2013.
The Mexican Office Action for the corresponding Mexican patent application No. MX/a/2012/004859 issued on Aug. 16, 2013.
An English translation of the Chinese Office Action for the corresponding Chinese patent application No. 201080051707.5 issued on Mar. 3, 2014.
International Search Report of PCT/JP2010/069610.

*Primary Examiner* — Carlos Barcena
(74) *Attorney, Agent, or Firm* — Global IP Counselors, LLP

(57) ABSTRACT

A bipolar secondary battery current collector is a bipolar secondary battery current collector having electrical conductivity. The current collector has an expansion section that expands in a thickness direction of the current collector at a temperature equal to or higher than a prescribed temperature.

9 Claims, 4 Drawing Sheets

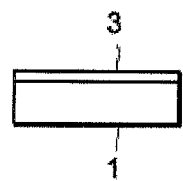 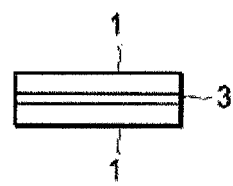 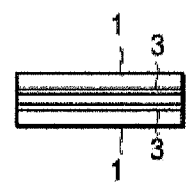
FIG. 1A   FIG. 1B   FIG. 1C
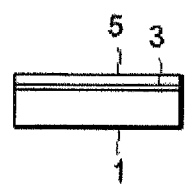 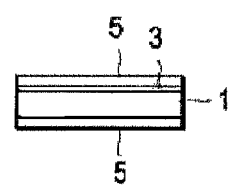 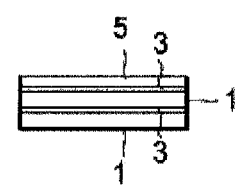
FIG. 1D   FIG. 1E   FIG. 1F
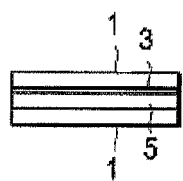 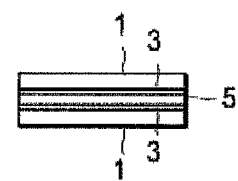 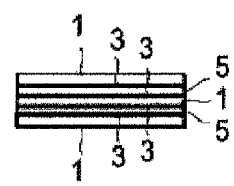
FIG. 1G   FIG. 1H   FIG. 1I

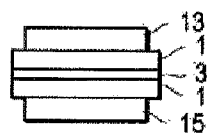
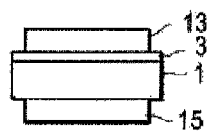
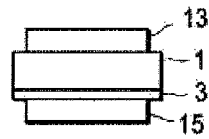
FIG. 3A  FIG. 3B  FIG. 3C
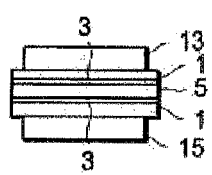
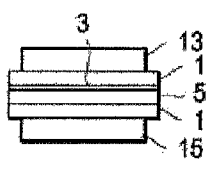
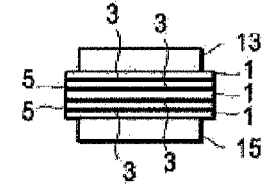
FIG. 3D  FIG. 3E  FIG. 3F
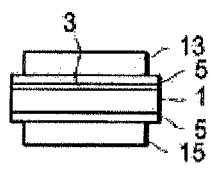
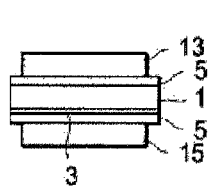
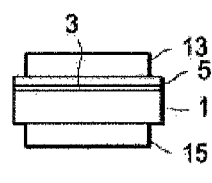
FIG. 3G  FIG. 3H  FIG. 3I
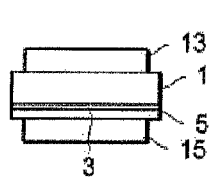
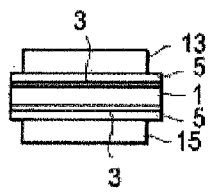
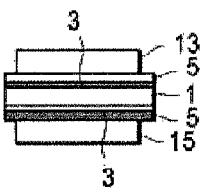
FIG. 3J  FIG. 3K  FIG. 3L
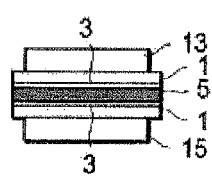
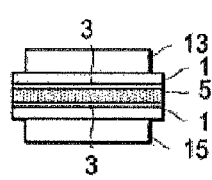
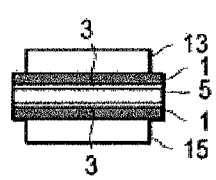
FIG. 3M  FIG. 3N  FIG. 3O
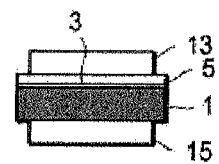
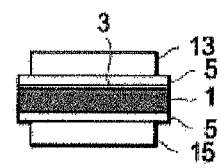
FIG. 3P  FIG. 3Q

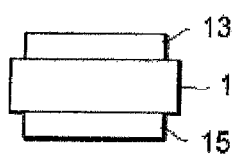 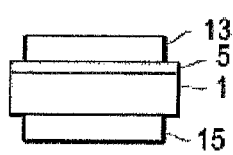 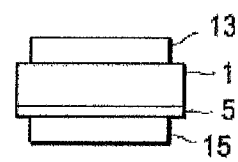
FIG. 4A   FIG. 4B   FIG. 4C
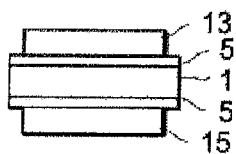 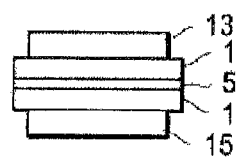
FIG. 4D   FIG. 4E

CURRENT COLLECTOR FOR BIPOLAR SECONDARY BATTERY

CROSS-REFERENCE TO RELATED APPLICATIONS

This application is a U.S. National stage application of International Application No. PCT/JP2010/069610, filed Nov. 4, 2010, which claims priority under to Japanese Patent Application No. 2009-265181, filed in Japan on Nov. 20, 2009, the entire contents of which is hereby incorporated by reference.

BACKGROUND OF THE INVENTION

1. Field of the Invention

The present invention generally relates to a current collector for a bipolar secondary battery. In particular, the present invention relates to an improvement for suppressing a temperature increase of a bipolar secondary battery.

2. Background Information

In recent years, from the perspective of the environment and fuel consumption, hybrid vehicles (HEV), electric vehicles (EV), and fuel cell vehicles are being manufactured and sold, and new research continues. In such so-called electric powered vehicles, use of a power source device that can be charged and discharged is indispensible. Such secondary batteries as lithium ion batteries and nickel chloride batteries and electric double layer capacitors are used as this power source device. In particular, due to their high energy density and high durability with respect repeated charging and discharging, lithium ion secondary batteries are considered well-suited to electric powered vehicles and various development avenues are being diligently pursued. In order to employ a secondary battery as a power source for driving a motor in any of the aforementioned electric powered vehicles, it is necessary to use a plurality of the secondary batteries connected together in series to secure a large output.

However, when batteries are connected through connecting parts, the output declines due to an electrical resistance of the connecting parts. Also, batteries having connecting parts are disadvantageous spatially. That is, due to the connecting parts, declines of the output density and the energy density are incurred.

Bipolar lithium ion secondary batteries and other bipolar secondary batteries have been developed as ways to solve this problem. The bipolar secondary batteries have an electric power generating element comprising a plurality of bipolar electrodes stacked with electrolyte layers in-between, the bipolar electrodes each comprising a positive electrode active material layer formed on one surface of a current collector and a negative electrode active material layer formed on the other surface. In other words, the bipolar secondary battery has a structure in which a positive electrode active material layer, an electrolyte layer, and a negative electrode active material layer form one single cell layer and the single cell layers are stacked in series with current collectors in-between.

In recent years, regarding such bipolar secondary batteries, technologies have been developed that lighten the weight of the current collectors and improve an output density per unit weight of the battery by including a macromolecular material in the current collectors (e.g., Japanese Laid-Open Patent Publication No. 2006-190649).

SUMMARY

However, with the conventional bipolar secondary battery explained above, when a temperature of the battery interior increases, an exothermic reaction between the electrolyte and the electrodes advances and there is a possibility that the battery temperature will increase further.

Therefore, an object of the present disclosure is to provide a current collector for bipolar secondary battery that can suppress an increase of the battery temperature.

A current collector for bipolar secondary battery has electrical conductivity. The current collector has an expansion section that expands in a thickness direction of the current collector at a temperature equal to or higher than a prescribed temperature.

With the current collector, the expansion section expands in the thickness direction of the current collector when the temperature of the battery interior increases to a prescribed temperature or higher. Consequently, an electrical resistance increases in the thickness direction of the current collector and an amount of electric current flowing in that direction decreases. As a result, an increase of the battery temperature is suppressed.

BRIEF DESCRIPTION OF THE DRAWINGS

Referring now to the attached drawings which form a part of this original disclosure.

FIGS. 1A to 1I are cross sectional views expressing in a simple fashion a current collector for bipolar secondary battery according to preferred embodiments.

FIGS. 3A to 3Q are cross sectional views expressing in a simple fashion a bipolar electrode fabricated in accordance with Working Examples 1 to 17.

FIGS. 4A to 4E are cross sectional views expressing in a simple fashion a bipolar electrode fabricated in accordance with Comparative Examples 1 to 5.

DETAILED DESCRIPTION OF THE EMBODIMENTS

Figure 2:
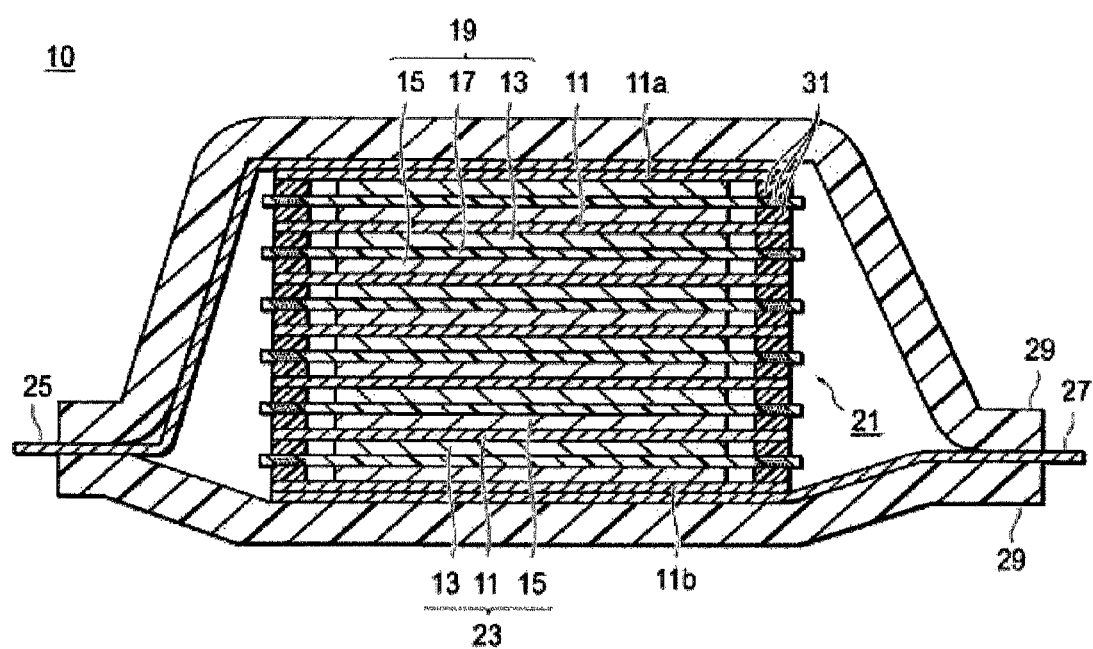
FIG. 2 is a cross sectional view expressing in a simple fashion an entire structure of a bipolar secondary battery according to one embodiment.

A preferred embodiment of the present invention will now be explained. One embodiment of the present invention is a current collector for bipolar secondary battery having electrical conductivity. The current collector is characterized by having an expansion section that expands in a thickness direction of the current collector at a temperature equal to or higher than a prescribed temperature.

Although the embodiment will be explained with reference to the drawings, the technical scope of the present invention is not limited to the embodiment explained below and should be defined based on what is written in the claims. In explaining the drawings, elements that are the same are assigned the same reference numerals and duplicate explanations are omitted. The dimensional proportions of the drawings are exaggerated for convenience of explanation and the actual proportions may be different.

The current collector has a function of a medium through which electrons move from one surface on which a positive electrode active material layer is formed to the other surface on which a negative electrode active material layer is formed. The current collector according to a preferred embodiment of the present invention includes a resin layer having electrical conductivity (hereinafter called simply "resin layer") and an adhesive layer having electrical conductivity (hereinafter called simply "adhesive layer"). Additionally, an ion blocking layer and other layers are included as required. The scope of the present invention is not limited to such an embodiment and all embodiments that satisfy the requirements set forth in the claims are included within the scope of the present invention even if they do not include these layers.

FIGS. 1A to 1I are cross sectional views expressing in a simple fashion a current collector for bipolar secondary battery according to a preferred embodiment. The current collectors of FIGS. 1A to 1I comprise one or two or more resin layers 1 having electrical conductivity and one or two or more adhesive layers 3 having electrical conductivity that are stacked or layered on one another. More specifically, the current collectors of FIGS. 1A to 1C comprise one or two or more resin layers 1 and one or two or more adhesive layers 3 stacked on one another. Meanwhile, the current collectors of FIGS. 1D to 1I include an ion blocking layer 5 in addition to the resin layers 1 and the adhesive layers 3 and have a structure in which these are stack or layered on one another. In particular, in the embodiments of FIGS. 1D to 1F, the ion blocking layer(s) 5 is positioned on an outermost layer of one side and/or the other side of the current collector, and in the embodiments of FIGS. 1G to 1I, the ion blocking layer(s) 5 is sandwiched between a resin layer 1 and/or an adhesive layer 3. Additionally, in each of the current collectors of FIGS. 1A to 1I, one side of at least one of the contact layers 3 adjoins one side of at least one of the resin layers 1. In the embodiments shown in FIG. 1, the adhesive layers 3 have a lower melting point than the resin layers 1. However, a current collector according to the present invention, is not limited solely to such embodiments.

The resin layers 1 are made of, for example, a resin that is obtained by adding ketjen black to polyethylene as an electrically conductive filler. The adhesive layers 3 are made of, for example, an adhesive containing carbon particles serving as an electrically conductive filler and thermally expandable microcapsules comprising a polyvinyl chloride gel enclosing hexane as an expansion material. The aforementioned thermally expandable microcapsules of the embodiment correspond to the expansion section in the present invention. Thus, it can be said that the adhesive layer 3 is an expansion section of the current collector. Also it can be said that the resin layer 1 is an expansion section of current collector. Further, the adhesive layer 3 can also be considered a part of the expansion section of the current collector since the adhesive layer 3 is electrically conductive. The ion blocking layer 5 is made of, for example, copper foil.

In the thermally expandable microcapsules contained in the adhesive layer 3 of the current collector according to the embodiment shown in FIG. 1, when the temperature increases, the expansion material enclosed in the gel vaporizes and expands. Consequently, when the temperature of the current collector increases to a prescribed temperature or higher, the adhesive layer 3 expands in the thickness direction (stacking direction) of the current collector. As a result, an electrical resistance increases in the thickness direction of the current collector and an amount of electric current flowing in that direction decreases.

In a preferred embodiment, as the temperature increases, the adhesive layer 3 melts and the current collector becomes divided. In this way, too, the electrical resistance in the thickness direction of the current collector can be made to increase such that the amount of electric current flowing in that direction decreases. Afterwards, if the temperature increases further, the resin layers 1 will also melt. When this occurs, a surface of the active material layers formed on the surfaces of the current collector is covered by the resin making up the melted resin layers 1. As a result, an exothermic reaction between the active material layers and the dielectric can be suppressed.

Constituent parts of the current collector of this embodiment will now be explained in detail.

While the electrically conductive resin layer 1 certainly functions as an electron movement medium, it can also contribute to reducing the weight of the current collector. The resin layer 1 is made of a macromolecular base material and can include an electrically conductive filler and other materials as necessary.

For the resin used as the base material, any known non-conductive macromolecular material or electrically conductive macromolecular material can be used without limitation. Preferred non-conductive macromolecular materials include, for example, polyethylene (PE; high-density polyethylene (HDPE), low density polyethylene (LDPE)), polypropylene (PP), polyethylene terephthalate (PET), polybutylene terephthalate (PBT), polyether nitrile (PEN), polyimide (PI), polyamide-imide (PAI), polyamide (PA), polytetrafluoroethylene (PTFE), styrene butadiene rubber (SBR), polyacrylonitrile (PAN), polymethylacrylate (PMA), poly(methyl methacrylate) (PMMA), polyvinyl chloride (PVC), polyvinylidene difluoride (PVdF), polystyrene (PS), silicone resin, cellulose, and epoxy resin. Such a non-conductive macromolecular material can have superior voltage endurance and solvent resistance. Examples of preferred electrically conductive macromolecular materials include, for example, polyaniline, polypyrrole, polythiophene, polyacetylene, polyparaphenylene, polyphenylene venylene, polyacrylonitrile, and polyoxadiazole. Since such a conductive macromolecular material has a sufficient electrical conductivity not to add an electrically conductive filler, it is advantageous from the standpoint of simplifying a manufacturing process and reducing the weight of the current collector.

The current collector of this embodiment can include one or two or more resin layers 1, and at least one of the resin layers 1 preferably contains a thermoplastic macromolecular material that melts when heated. If at least one of the resin layers 1 contains a thermoplastic macromolecular material, then when the temperature of the battery interior increases, that resin layer 1 will melt and the active material layers formed on the surfaces of the current collector will be covered with the melted resin. As a result, an exothermic reaction between the active material layers and the electrolyte can be suppressed and an increase of the battery temperature can be prevented, which is preferable.

The non-conductive macromolecular material or the conductive material can be selected by one skilled in the art as appropriate in view of a temperature at which the bipolar secondary battery will be used. Also, it is acceptable to use one type of macromolecular material alone or to use a mixture of two or more types of macromolecular material combined. Furthermore, when the current collector includes two or more resin layers 1, it is acceptable to use a different macromolecular material in each of the resin layers 1.

An electrically conductive filler can be added to the electrically conductive macromolecular material or the non-conductive macromolecular material as necessary. In particular, if the resin serving as the base material of the current collector is made solely of a non-conductive macromolecule, then it will be inherently necessary to add an electrically conductive filler to impart an electrically conductive quality to the resin. Any electrically conductive filler can be used with no particular restrictions so long as it is a substance that has an electrically conductive quality. For example, a metal or an electrically conductive carbon can be cited as materials having excellent electrical conductivity, voltage endurance, and lithium ion blocking performance.

There are no particular restrictions on the metal, but it is preferable to use one metal, an alloy of metals, or an oxide of a metal selected from among the group consisting of Ni, Ti, Al, Cu, Pt, Fe, Cr, Sn, Zn, In, Sb, and K. These metals have a resistance to an electric potential on the positive electrode or the negative electrode formed on a surface of the current collector. Among these, it is preferable to select an alloy containing at least one metal selected from among the group consisting of Ni, Ti, Al, Cu, Pt, Fe, and Cr.

More specifically, such alloys as stainless steel (SUS), Inconel (registered trademark), Hastelloy (registered trademark), and other allows based on Fe—Cr and Ni—Cr can be cited. By using these alloys, a higher voltage resistance can be obtained.

There are no particular restrictions on an electrically conductive carbon, but it is preferable to selected at least one from the group consisting of acetylene black, Vulcan, black pearl, carbon nanofibers, ketjen black, carbon nanotubes, carbon nanohorns, carbon nanoballoons, and fullerene. These electrically conductive carbons have a very wide electric potential window, are stable over a wide range with respect to both the positive electrode potential and the negative electrode potential, and have an excellent electrical conductivity. Also, since the density is smaller than an electrically conductive filler containing the aforementioned metals, the weight of the current collector can be reduced. Also, a regarding these electrically conductive fillers made of a metal or an electrically conductive carbon, it is possible to use one type alone or to use a combination of two or more types. Furthermore, when the current collector includes two or more resin layers 1, it is acceptable to use a different electrically conductive filler in each of the resin layers 1.

There are no particular restrictions on the size of the electrically conductive filler; various sizes of filler can be used depending on the thickness and size of the resin layer 1 and the shape of the electrically conductive filler. As an example, if the electrically conductive filler has a particulate form, then the average particle diameter is preferably 0.1 to 10 μm from the standpoint of making it easy to form the resin layer 1. In this patent specification, "particle diameter" means the largest distance L among the shortest distances between any two points on a contour outline of the electrically conductive filler. The value of the "average particle size" used is calculated as an average value of a particle diameter of particles observed in several to several tens of viewing fields using a scanning electron microscope (SEM) or a transmission electron microscope (TEM). The particle diameter and average particle diameter of the active substances explained later can be defined in the same manner.

There are no particular restrictions on the amount of electrically conductive filler contained in the resin layer 1. If the resin contains an electrically conductive macromolecular material and a sufficient electrical conductivity can be secured, then it may not be necessary to add an electrically conductive filler. However, if the resin is made of a non-conductive macromolecular material, then adding an electrically conductive filler is necessary to impart an electrically conductive quality. In such a case, the content amount of the electrically conductive filler with respect to the total mass of the non-conductive macromolecular material is preferably 5 to 35 mass %, more preferably 5 to 25 mass %, and still more preferably 5 to 15 mass %. By adding such an amount of electrically conductive filler to the resin, a mass increase of the resin layer 1 can be suppressed and a sufficient electrical conductivity can be imparted to the non-conductive macromolecular material.

There are no particular restrictions on the form of the electrically conductive filler and such known forms as particulate, fibrous, plate-like, agglomerate, cloth-like, and mesh-like can be selected as appropriate. For example, if one wishes to impart an electrically conductive quality across a wide region in the resin, then it is preferable to use an electrically conductive filler that is particulate. Meanwhile, if one wishes to increase the electrical conductivity in a specific direction within the resin, then it is preferable to use an electrically conductive filler that is fibrous or has another form that has a fixed directionality.

The thickness of the electrically conductive resin layer 1 is preferably thin in order to reduce the weight and, thereby, increase an output density of the battery. More specifically, the thickness of one layer's worth of the electrically conductive resin layer 1 is preferably 0.1 to 200 μM, more preferably 5 to 150 μm, and still more preferably 10 to 100 μm.

The electrically conductive adhesive layer 3 functions to adhere the constituent parts (the layers) contained in the current collector together or adhere the current collector and the active material layers formed on the surfaces of the current collector together. Additionally, the adhesive layer 3 according to this embodiment functions to expand in the stacking direction of the current collector at a temperature lower than the melting point of the adhesive layer itself. Moreover, in this specification, "expand" means that a thickness of the adhesive layer in a thickness direction (stacking direction) becomes thicker by 1.05 times or more at 25° C.

There are no particular restrictions on the material making up the adhesive layer so long as the materials function as an adhesive and to expand in the thickness direction (stacking direction) as the temperature increases; known materials can be used as appropriate. For example, in order to impart an expanding function, it is preferable for the adhesive layer 3 to contain a thermally expandable microcapsule comprising an expansion material enclosed in a gel containing a thermoplastic macromolecular material. When the temperature increases, the expansion material of the thermally expandable microcapsules vaporizes and expands the gel. Consequently, the adhesive layer 3 can be expanded in the thickness direction (stacking direction).

There are no particular restrictions on the thermoplastic macromolecular material contained in the gel of the thermally expandable microcapsules, but it is necessary for the thermoplastic macromolecular material to melt before (i.e., at a lower temperature a temperature at which) other constituent parts of the battery (base materials of resin layer 1 and adhesive layer 3) undergo thermal decomposition when a temperature of the bipolar secondary battery increases. The thermoplastic macromolecular material constituting the gel of the thermally expandable microcapsule can be selected in consideration of this necessity. For example, polyethylene, polypropylene, polyvinyl alcohol, polyvinyl acetal, polyvinyl acetate, polyvinyl chloride, acrylic resin, chloroprene rubber, nitrile rubber, styrene butadiene rubber (SBR), butyl rubber, and silicon rubber and other elastomers can be cited. Among these thermoplastic macromolecular materials, preferably, it is preferable to include polyethylene or polypropylene.

There are no particular restrictions on the expansion material enclosed inside the gel of the thermally expandable microcapsules so long as it can vaporize as the temperature increases and cause the gel to expand; the expansion material can be selected as appropriate by one skilled in the art based on a temperature at which the battery will be used. In this embodiment, since the expansion material vaporizes and expands the gel before the gel of the microcapsules melts, the adhesive layer 3 can be expanded in the thickness direction (stacking direction) as explained previously. Consequently, in this embodiment, it is necessary for a boiling point of the expansion material to be lower than the boiling point of the thermoplastic macromolecular material making up the gel. Thus, the type of expansion material can be selected in consideration of the type of material used in the gel (particularly the melting point of the material). As an example of an expansion material, an annular or chain-like liquid hydrocarbon (e.g., hexane) can be cited, but the invention is not limited so such a material. Existing knowhow can be referred to as appropriate.

In addition to the aforementioned thermally expandable microcapsules, it is possible to add another thermoplastic macromolecular material or an electrically conductive filler to the adhesive layer 3. The previously mentioned thermoplastic macromolecular materials that can be included in the resin layer 1 or the gel of the thermally expandable microcapsules can be used as appropriate as another thermoplastic macromolecular material. Also, the previously mentioned electrically conductive fillers that can be included in the resin layer 1 can be used as appropriate as an electrically conductive filler. Therefore, a detailed explanation of these specific materials is omitted.

As explained previously, the adhesive layer 3 expands in the stacking direction of the current collector at a temperature lower than the melting point of the adhesive layer itself. Consequently, when the temperature of the current collector increases to a prescribed temperature or higher, the adhesive layer 3 expands in the thickness direction (stacking direction) of the current collector. As a result, the electrical resistance in the thickness direction of the current collector increases and an amount of electric current flowing in that direction decreases. In this specification, "melting point of the adhesive layer" means melting point of the material making up the adhesive layer 3. If the adhesive layer 3 contains two or more materials, then the lowest temperature among the melting points of the materials is treated as the melting point of the adhesive layer 3.

While the temperature at which the adhesive layer 3 expands in the stacking direction is preferably lower than the melting temperature of the adhesively layer, it is more preferably at least 10° C. lower than the melting point of the adhesive layer 3, even more preferably at least 20° C. lower, still more preferably at least 30° C. lower, particularly preferably at least 40° C. lower, and most preferably at least 50° lower. When the temperature at which the adhesive layer 3 expands is such a temperature, the adhesive layer 3 will melt after expanding sufficiently in the thickness direction (stacking direction) and, thus, the electrical resistance of the current collector can be increased more reliably.

Moreover, the melting point of the adhesive layer 3 in this embodiment is preferably lower than the melting point of the previously explained resin layer 1. Consequently, melting of the resin layer 1 occurs after the adhesive layer 3 has expanded in the thickness direction (stacking direction) and melted. As a result, the melted resin can be moved toward the surfaces of the current collector and the active material layers formed on the surfaces of the current collector can be covered with the melted resin. In this specification, "melting point of the resin layer" means melting point of the macromolecular material making up the resin layer 1. If the resin layer 1 contains two or more macromolecular materials, then the lowest temperature among the melting points of the macromolecular materials is treated as the melting point of the resin layer 1.

There are no limitations on the thickness of the adhesive layer 3, but the thickness of one layer's worth is preferably 0.5 to 10 µm, more preferably 1 to 5 µm, and still more preferably 1 to 3 µm. When the adhesive layer 3 has such a thickness, the aforementioned temperature increase suppression effect of the battery can be sufficiently exhibited.

There are no particular restrictions on the method of making the adhesive layer 3; existing knowhow can be used as appropriate. As an example, the constituent parts contained in the adhesive layer 3 explained heretofore can be dispersed in a solvent to fabricate a slurry and the slurry can be coated onto a surface of the resin layer 1 and dried to make the adhesive layer.

Another advantage is that each of the layers of the current collector adhered with the adhesive layer 3 can be recycled easily by removing the adhesive layer 3.

The ion blocking layer 5 has an electrically conductive quality and a function of preventing ion transmission inside the current collector (a partition wall (barrier) function). Consequently, degradation of the current collector can be prevented and a durability of the battery can be improved.

As an example of a material used in the ion blocking layer 5, at least one selected from the group consisting of copper; aluminum; iron; chromium; nickel; titanium; vanadium; molybdenum; niobium; alloys, metal carbides, metal nitrides, and metal oxides of these metals; diamond-like carbon (DLC); and glassy carbon can be cited. Among these, it is preferable to use at least one selected from the group consisting of copper, aluminum, and diamond-like carbon from the standpoint of stability against electric potential, light weight, and low cost.

The thickness of the ion blocking layer 5 should be set such that a function of preventing ion transmission inside the current collector is manifested. Specifically, the thickness of the ion blocking layer 5 is preferably 0.001 to 50 µm. If there are several of the ion blocking layers 5, then it is preferable for at least one of the thicknesses to be in the aforementioned range and more preferable for the thicknesses of all of the ion blocking layers 5 to be in the aforementioned range.

It is acceptable for the number of ion blocking layers 5 arranged in the current collector to be one layer or two or more layers. There are no particular restrictions on the position in which the ion blocking layer 5 is arranged either; providing it as an outermost layer of the current collector is acceptable, and providing it on an inward side of the resin layer 1 or the adhesive layer 3 is also acceptable.

In a preferred embodiment, one surface of the adhesive layer 3 and one surface of the ion blocking layer 5 are arranged to adjoin each other as in the embodiments of FIGS. 1D to 1I. In a more preferred embodiment, as in the embodiments of FIGS. 1G to 1I, the current collector includes two resin layers 1 and the two resin layers 1 are arranged so as to sandwich an adhesive-layer/ion-blocking-layer body in which one surface of an adhesive layer 3 and one surface of an ion blocking layer 5 are adjoined. In other words, with respect to the adhesive-layer/ion-blocking-layer body, one of the two resin layers 1 is arranged on the other surface of the ion blocking layer 5 and one is arranged on the other surface of the adhesive layer 3. With such an arrangement, since the ion blocking layer 5 and a division surface of the current collector that develops due to the expansion and melting of the adhesive layer 3 impede movement of resin from the melted resin layers 1, the melted resin can move more easily toward the surfaces of the current collector. Thus, the resin of the melted resin layer 1 covers the active material layers more easily. As a result, the surface area of the active material layers where exothermic reactions with the electrolyte occurs is made smaller and a temperature increase of the battery can be suppressed in an effective manner.

A conventional current collector including an ion blocking layer has the problem that when an internal short circuit occurs, electric current easily becomes concentrated due to the ion blocking layer and the battery emits a large amount of heat. However, with a current collector according to this embodiment, even if the current collector includes an ion blocking layer, it is possible to suppress a temperature increase of the battery in an effective manner.

FIG. 2 is a cross sectional view expressing in a simple fashion an entire structure of a bipolar secondary battery according to one embodiment of the present invention. The bipolar secondary battery 10 according to this embodiment shown in FIG. 2 has a structure in which a substantially rectangular electric power generating element 21 in which a charging/discharging reaction actually progresses is seated inside a laminate film 29 serving as a battery exterior package material.

As shown in FIG. 2, the electric power generating element 21 of the bipolar secondary battery 10 according to this embodiment has a plurality of bipolar electrodes 23 each of which has a positive electrode active material layer 13 electrically joined to one surface of a current collector 11 and a negative electrode active material layer 15 electrically joined to the opposite-side surface of the current collector 11. The bipolar electrodes 23 are stacked with electrolyte layers 17 in-between to form the electric power generating element 21. The electrolyte layers 17 each comprise an electrolyte held in a planar-direction central portion of a separator serving as a substrate. The bipolar electrodes 23 and the electrolyte layers 17 are stacked alternately such that the positive electrode active material layer 13 of one bipolar electrode 23 faces toward the negative electrode active material layer 15 of another bipolar electrode 23 adjacent to the one bipolar electrode 23 through an electrolyte layer 17. That is, each of the electrolyte layers 17 is sandwiched between the positive electrode active material layer 13 of one bipolar electrode 23 and the negative electrode active material layer 15 of another bipolar electrode 23 adjacent to the one bipolar electrode 23. Moreover, the bipolar secondary battery 10 of this embodiment includes current collectors according to the previously explained embodiment as the current collectors 11. In this way, an increase of a temperature of the bipolar secondary battery can be suppressed in an effective manner.

The positive active material layer 13, the electrolyte layer 17, and the negative active material layer 15 adjacent to one another constitute one single cell layer 19. The bipolar secondary battery 10 can be said to have a structure comprising a plurality of the single cell layers 19 stacked on one another. A positive electrode active material layer 13 is formed only on one side of a positive-electrode-side outermost-layer current collector 11a positioned in an outermost layer of the electric power generating element 21. Also, a negative electrode active material layer 15 is formed only on one side of a negative-electrode-side outermost-layer current collector 11b positioned in an outermost layer of the electric power generating element 21. However, it is also acceptable for positive electrode active material layers 13 to be formed on both surfaces of the positive-electrode-side outermost-layer current collector 11a. Likewise, it is acceptable for negative electrode active material layers 15 to be formed on both surfaces of the negative-electrode-side outermost-layer current collector 11b.

Additionally, in the bipolar secondary battery 10 shown in FIG. 2, a positive electrode current collecting plate 25 is arranged closely adjacent to the positive-electrode-side outermost-layer current collector 11a and extends so as to lead out from the laminate film 29 serving as a battery exterior package material. Meanwhile, a negative electrode current collecting plate 27 is arranged closely adjacent to the negative-electrode-side outermost-layer current collector 11b and, similarly, extends so as to lead out from the laminate film 29 serving as an exterior package of the battery.

In the bipolar secondary battery 10 shown in FIG. 2, an outer peripheral portion of each of the single cell layers 19 is sealed by being fused to a peripheral edge portion of the current collectors 11 and an peripheral edge portion of the separators in the electrolyte layers 17. With such a sealing means, it is possible to prevent a liquid junction in which electrolytic solution leaks out from a single cell layer 19 and contacts the electrolytic solution of another single cell layer 19. It is also possible to prevent contact between adjacent current collectors 11 inside the battery and short circuits caused by slight misalignments of the end portions of the single cell layers 19 in the electric power generating elements 21. Thus, with the sealing means of this embodiment, it is possible to provide a high-quality bipolar secondary battery 10 that ensures long-term reliability and safety.

The number of stacked single cell layers 19 is adjusted according to the desired voltage. With the bipolar secondary battery 10, it is also acceptable to decrease the number of stacked single cell layers 19 so long as a sufficient output can be ensured even though the thickness of the battery has been made as thin as possible. With the bipolar secondary battery 10, in order to prevent environmental degradation and physical shock from an external source during use, it is good to adopt a structure in which the electric power generating element 21 is vacuum sealed in the laminate film 29 serving as the battery exterior package material and the positive electrode current collecting plate 25 and the negative electrode current collecting plate 27 are drawn out to the exterior of the laminate film 29.

The bipolar electrode has a current collector and active material layers formed on the surfaces of the current collector. More specifically, a positive electrode active substance is formed on one surface of one current collector and a negative electrode active substance is formed on the other surface. The active material layers contain a positive electrode active substance or a negative electrode active substance and, if necessary, contain other additives. By using the current collector explained above, the bipolar electrode of this embodiment can suppress an increase of the battery temperature in an effective manner.

The positive electrode active material layer contains a positive electrode active substance. The positive electrode active substance has such a composition that it occludes ions during discharging and releases ions during charging. A lithium-transition metal complex oxide comprising a complex oxide of lithium and a transition metal can be cited as a preferred example. More specifically, it is possible to use such substances as $LiCoO_2$ and other complex oxides of Li and Co, $LiNiO_2$ and other complex oxides of Li and Ni, spinel $LiMn_2O_4$ and other complex oxides of Li and Mn, $LiFeO_2$ and other complex oxides of Li and Fe, and any of these substance with a portion of the transition metal replaced with another element. These lithium-transition metal complex oxides are low-cost materials having excellent reactivity and cyclability. Consequently, a battery having excellent output characteristics can be made by using these materials in the electrode. Other substances that can be used as the positive electrode active substance include $LiFePO_4$ and other phosphates and sulfates of a transition metal and lithium; $V_2O_5$, $MuO_2$, $TiS_2$, $MoS_2$, $MoO_3$ and other transition metal oxides and sulfides;

PbO$_2$; Ago; NiOOH. It is acceptable to use one of the positive electrode active substances explained above alone or to use a mixture of two or more.

There are no particular restrictions on the average particle diameter of the positive electrode active substance, but 1 to 100 μm is preferred and 1 to 20 μm is more preferred from the standpoint of cycle durability, reactivity, and a high capacity of the positive electrode active substance. If the average particle diameter is in such a range, then an increase of an internal resistance of the secondary battery can be suppressed when charging/discharging occurs under high-output conditions and a sufficient current can be extracted from the battery. If the positive active substance is a secondary particle, then it is preferable for the average particle diameter of the primary particles making up the secondary particles to be in the range of 10 nm to 1 μm, but this embodiment is not necessarily limited to the aforementioned range. It depends on the manufacturing method, but, needless to say, it is acceptable if the positive electrode active substance is flocculated or aggregated and not in the form of a secondary particle. The particle diameter of such a positive active substance and the particle size of the primary particle can be a median diameter obtained using a laser diffraction method. The shape of the positive electrode active substance obtainable will differ depending on the type and manufacturing method. Examples include spherical (powder), plate like, needle-like, rod-like, and cube-like, but the shape is not limited to these. Any shape can be used without a problem. It is preferable to an optimum shape as appropriate to improve charging/discharging characteristics and other battery characteristics.

The negative electrode active material layer contains a negative electrode active substance. The negative electrode active substance has such a composition that it can releases ion during discharging and occlude ions during charging. There are no particular restrictions on the negative electrode active substance so long as it can reversibly occlude and release lithium. Preferred examples of negative electrode active substances include such metals as Si and Sn; such metal oxides as TiO, Ti$_2$O$_3$, TiO$_2$, SiO$_2$, SiO, and SnO$_2$; such complex oxides of lithium and a transition metal as Li$_{4/3}$Ti$_{5/3}$O$_4$ and Li$_7$MnN; Li—Pb based alloys; Li—Al based alloys; Li; and such carbon materials as natural graphite, manmade graphite, carbon black, activated carbon, carbon fiber, coke, soft carbon, and hard carbon. The negative electrode active material preferably includes an element that alloys with lithium. By using an element that alloys with lithium, it is possible to obtain a high-capacity battery that has an excellent output characteristic and a higher energy density than can be obtained with a conventional carbon based material. It is acceptable to use one of the negative electrode active substances explained above alone or to use a mixture of two or more.

Although not limited to these, the following specific examples of elements that alloy with lithium can be cited: Si, Ge, Sn, Pb, Al, In, Zn, H, Ca, Sr, Ba, Ru, Rh, Ir, Pd, Pt, Ag, Au, Cd, Hg, Ga, Tl, C, N, Sb, Bi, O, S, Se, Te, and Cl. Among these, from the standpoint of configuring a battery with excellent capacity and energy density, it is preferable to include at least one element selected from the group consisting of carbon material and/or Si, Ge, Sn, Pb, Al, In, and Zn and particularly preferable to include the element carbon material, Si, or Sn. It is acceptable to use one of these alone or to use two or more together.

There are no particular restrictions on the particle diameter and shape of the negative electrode active substance, and a detailed explanation is omitted here because the same forms as the previously explained positive electrode active substance can be adopted.

If necessary, it is acceptable to include other substances in the active material layers. For example, a conduction assisting agent or a binder can be included. Also, if an ion conductive polymer is included, then it is acceptable to include a polymerization initiator to polymerize the polymer.

The conduction assisting agent is an additive blended to improve the electrical conductivity of the active material layer. Acetylene black, carbon black, ketjen black, graphite and other carbon powders, vapor grown carbon fiber (VGCF, registered trademark) and various other carbon fibers, and expanded carbon can be cited as conduction assisting agents. However, needless to say, the conduction assisting agent is not limited to these.

Polyvinylidene difluoride (PVdF), polyimide, PTFE, SBR, and synthetic rubber based binders can be cited as binders. However, needless to say, the binder is not limited to these. Also, it is not necessary to use a binder when the binder and a matrix polymer used as a gel dielectric are the same.

There are no particular limitations on the blend ratios of the components contained in the active material layers. The blend ratios can be adjusted by referring to existing knowhow regarding lithium ion secondary batteries as appropriate. There are no particular limitations on the thickness of the active material layers and it is possible to refer to existing knowhow regarding lithium ion secondary batteries as appropriate. To cite an example, the thickness of the active material layers is preferably 10 to 100 μm and more preferably 20 to 50 μm. If the active material layer is at least 10 μm, then a sufficient battery capacity can be ensured. Meanwhile, if the active material layer is not larger than approximately 100 μm, then it is possible to suppress an occurrence of the problem of the internal resistance increasing due to it becoming more difficult for lithium ions to diffuse in an electrode deep portion (current collector side).

There are no particular restrictions on the method of forming the positive electrode active material layer (or negative electrode active material layer) on a current collector surface and known methods can be used in the same manner. For example, as explained previously, a positive electrode substance slurry (or a negative electrode substance slurry) can be prepared by dispersing or dissolving the positive electrode active substance (or negative electrode active substance)—as well as, if necessary, an electrolyte salt for increasing ion conductivity, a conduction assisting agent for increasing electron conductivity, and a binder—in an appropriate solvent. The positive electrode active material layer (or negative electrode active material layer) is formed on the current collector by coating the slurry onto the current collector and pressing the slurry after it has been dried and the solvent removed. There are no particular limitations on the solvent and N-methyl-2-pyrrolidone (NMP), dimethylformamide, dimethylacetamide, methylformamide, cyclohexsane, and hexane can be used. If polyvinylidene difluoride (PVdF) is used as a binder, then it is acceptable to use NMP as a solvent.

In the method explained above, the positive electrode active substance slurry (or negative electrode active substance slurry) is coated onto the current collector and pressed after it has dried. By adjusting the press conditions, a void ratio of the positive active material layer (or negative active material layer) can be controlled.

There are no particular restrictions on the specific means and press conditions of the press process and these can be adjusted as appropriate such that the void ratio of the positive electrode material layer (or negative electrode material layer)

obtained after the press process can be set to a desired value. A hot press machine and a calendar roll press machine can be cited as examples of a concrete form of the press process. There are not particular restrictions on the press conditions (temperature, pressure, etc.) and existing knowhow can be referred to as appropriate.

The electrolyte layers function as a medium through which lithium ions move between electrodes. There are no particular restrictions on the electrolyte from which the electrolyte layer is made; a liquid electrolyte or such a polymer electrolyte as a macromolecular gel electrolyte or a macromolecular solid electrolyte can be used as appropriate.

A liquid electrolyte is a solvent in which a lithium salt is dissolved as a supporting electrolyte. The following examples of solvents can be cited: dimethyl carbonate (DMC), diethyl carbonate (DEC), dipropyl carbonate (DPC), ethylmethyl carbonate (EMC), methyl propionate (MP), methyl acetate (MA), methyl formate (MF), 4-methyl dioxolane (4MeDOL), dioxolane (DOL), 2-methyltetrahydrofuran (2MeTHF), tetrahydrofuran (THF), dimethoxyethane (DME), ethylene carbonate (EC), propylene carbonate (PC), butylene carbonate (BC), and γ-butyrolactone (GBL). It is acceptable to use one of these solvents alone or to use a mixture of two or more combined.

Also, while there are no particular restrictions on the supporting electrolyte (lithium salt), citable support electrolytes include such inorganic acid salt anions as LiPF6, LiBF4, $LiClO_4$, $LiAsF_6$, $LiTaF_6$, $LiSbF_6$, $LiAlCl_4$, $Li_2B_{10}Cl_{10}$, LiI, LiBr, LiCl, LiAlCl, $LiHF_2$, and LiSCN and such organic acid salt anions as $LiCF_3SO_3$, $Li(CF_3SO_2)N$, LiBOB, (lithium bis oxide borate), LiBETI (lithium bis(perfluoroalkyl ethylene sulfonylimide), and $Li(C_2F_5SO_2)_2N$. It is acceptable to use one of the electrolyte salts explained above alone or to use a mixture of two or more.

Meanwhile, a macromolecular gel electrolyte is made by injecting a liquid electrolyte as explained above into a matrix polymer having a lithium ion conductive quality. Citable examples of a matrix polymer having a lithium ion conductive quality include polymers (PEO) having polyethylene oxide as a principle chain or a side chain, polymers (PPO) having polypropylene oxide as a principle chain or a side chain, polyethylene glycol (PEG), polyacrylonitrile (PAN), polymethacrylic acid ester, polyvinylidene difluoride (PVdF), copolymer of polyvinylidene difluoride and hexafluoropropylene (PVdF-HFP), polyacrylonitrile (PAN), and poly(m-ethylacrylate) (PMA), poly(methyl methacrylate) (PMMA). It is also possible to use a mixture, a modification, a derivative, random copolymer, an alternating copolymer, a graft copolymer, or a block copolymer of the aforementioned polymers. Among these, PEO, PPO, and copolymers of these; PVdF; and PVdF-HFP are desirable to use. A lithium salt or other electrolyte salt can be dissolved well in such a matrix polymer. Also, by forming a bridge structure, the matrix polymer can exhibit an excellent mechanical strength.

If the electrolyte layer is made of a liquid electrolyte or a gel electrolyte, then it is acceptable to use a separator in the electrolyte layer. A concrete form of a separator that can be cited is, for example, a microporous membrane made of such polyolefins as polyethylene and polypropylene, such hydrocarbons as polyvinylidene fluoride-hexafluoropropylene (PVdF-HFP), or glass fiber.

A macromolecular solid electrolyte is made by dissolving the aforementioned matrix polymer in a supporting electrolyte (lithium salt) and does not contain an organic solvent. Consequently, when the electrolyte layer is made of a macromolecular solid electrolyte, there is no concern about liquid leaking from the battery and the reliability of the battery can be improved.

Also, by forming a bridge structure, a matrix polymer made of a macromolecular gel electrolyte or a macromolecular solid electrolyte can exhibit an excellent mechanical strength. In order to form the bridge structure, it is acceptable to use an appropriate polymerization initiator and apply such a polymerization treatment as thermal polymerization, ultraviolet polymerization, radiation polymerization, or electron polymerization to a polymerizable polymer (e.g., PEO or PPO) intended for forming a macromolecular electrolyte. It is acceptable if the aforementioned electrolyte is included in the active material layers of the electrodes.

Seal sections (insulation layers) function to prevent contact between current collectors and short circuits at end portions of the single cell layers. A material used to make the seal sections should have an insulating quality, a sealing quality against dislodgement of the solid electrolyte and a sealing quality (airtight quality) against water and moisture permeation from the exterior, and a heat resistant quality under the battery operating temperature. For example, urethane resin, epoxy resin, polyethylene resin, polypropylene resin, polyimide resin, or rubber can be used. Among these, polyethylene resin and polypropylene resin are preferred constituent materials for the insulation layer from the standpoint of corrosion resistance, chemical resistance, ease of fabrication (film formability), and economic efficiency.

Other than using a known metal box-like case as the battery exterior package material, it is also possible to use a bag-like case made of a laminate film that contains aluminum and can cover the electric power generating element. As the laminate film, for example, a laminate film having a three-layer structure of polypropylene, aluminum, and nylon laminated successively can be used, but the laminate film is not limited to these. In this embodiment, it is desirable to use a laminate film that has excellent high output and cooling performance and can be used suitably in a battery for large machines such as EV and HEV.

WORKING EXAMPLES

Operational effects of the present invention will now be explained using working examples and comparative examples presented below. However, the technical scope of the present invention is not limited to the working examples presented below. Bipolar electrodes where fabricated using current collectors having different materials and stacking structures for the resin layers, ion blocking layers, and adhesive layers. Using these bipolar electrodes, bipolar secondary batteries were fabricated and the internal resistance was evaluated under low temperature and high temperature conditions. Also, a stacked body of the current collectors and active material layers and the electrolyte were heated and the amount of heat emitted due to an exothermic reaction between the active material layers and the dielectric was evaluated.

As a positive electrode active substance, a positive electrode active substance slurry was prepared by mixing LiMn2O4 at 85 mass %, acetylene black at 5 mass % as a conduction assisting agent, polyvinylidene difluoride (PVDF) at 10 mass % as a binder with N-methyl-2-propylene (NMP) as a slurry viscosity adjusting solvent.

As a negative electrode active substance, a negative electrode active substance slurry was prepared by mixing hard carbon at 90 mass % and PVDF at 10 mass % as a binder with NMP as a slurry viscosity adjusting solvent.

Working Example 1

As a resin layer having a conductive quality, a film having a thickness of 12.5 μm was prepared which comprises polyethylene at 100 mass % with ketjen black added at 5 mass %. As an adhesive having a conductive quality, an adhesive A was prepared which comprises thermally expandable microcapsules with carbon particles serving as an electrically conductive material added at 20 mass % and has had its viscosity adjusted using xylene. The thermally expandable microcapsules comprise polyvinyl chloride shells (particle diameter 200 nm, melting point 125° C.) enclosing hexane as an expansion material. The adhesive A was coated onto one surface of the aforementioned resin layer to a thickness of 2 μm and one more resin layer was overlaid thereon and adhered so as to fabricate a current collector comprising a resin layer, an adhesive layer, and a resin layer.

The aforementioned positive electrode active substance slurry was coated onto one surface of the current collector obtained, and a positive electrode active material layer having a thickness of 36 μm was formed by pressing the coated slurry after drying it. The aforementioned negative electrode active substance slurry was coated onto the other surface of the current collector, and a negative electrode active material layer having a thickness of 30 μm was formed by pressing the coated slurry after drying it, thus completing a bipolar electrode of FIG. 3A.

Working Example 2

As a resin layer having electrical conductivity, a film having a thickness of 25 μm was prepared which comprises polyethylene at 100 mass % with ketjen black added at 5 mass %. The adhesive A was coated onto one surface of the resin layer to a thickness of 2 μm and dried so as to fabricate a current collector comprising a resin layer and an adhesive layer.

The aforementioned positive electrode active substance slurry was coated onto the surface of the adhesive layer side of the current collector obtained, and a positive electrode active material layer having a thickness of 36 μm was formed pressing the coated slurry after drying it. The aforementioned negative electrode active substance slurry was coated onto the surface of the resin layer side of the current collector, and a negative electrode active material layer having a thickness of 30 μm was formed by pressing the coated slurry after drying it, thus completing a bipolar electrode of FIG. 3B.

Working Example 3

As a resin layer having electrical conductivity, a film having a thickness of 25 μm was prepared which comprises polyethylene at 100 mass % with ketjen black added at 5 mass %. The adhesive A was coated onto one surface of the resin layer to a thickness of 2 μm and dried so as to fabricate a current collector comprising a resin layer and an adhesive layer.

The aforementioned positive electrode active substance slurry was coated onto the surface of the resin layer side of the current collector obtained, and a positive electrode active material layer having a thickness of 36 μm was formed by pressing the coated slurry after drying it. The aforementioned negative electrode active substance slurry was coated onto the surface of the adhesive layer side of the current collector, and a negative electrode active material layer having a thickness of 30 μm was formed by pressing the coated slurry after drying it, thus completing a bipolar electrode of FIG. 3C.

Working Example 4

As a resin layer having electrical conductivity, a film having a thickness of 12 μm was prepared which comprises polyethylene at 100 mass % with ketjen black added at 5 mass %. The aforementioned adhesive A was coated to a thickness of 1 μm on one surface of the resin layer and a copper foil having a thickness of 2 μm was overlaid and adhered thereon as an ion blocking layer. The adhesive A was coated onto the surface of the copper foil side of the resin layer to a thickness of 1 μm and one more resin layer was overlaid thereon and adhered to fabricate a current collector comprising a resin layer, an adhesive layer, an ion blocking layer, an adhesive layer, and a resin layer.

The aforementioned positive electrode active substance slurry was coated onto one surface of the current collector obtained, and a positive electrode active material layer having a thickness of 36 μm was formed by pressing the coated slurry after drying it. The aforementioned negative electrode active substance slurry was coated onto the other surface of the current collector, and a negative electrode active material layer having a thickness of 30 μm was formed by pressing the coated slurry after drying it, thus completing a bipolar electrode of FIG. 3D.

Working Example 5

As a resin layer having electrical conductivity, a film having a thickness of 12 μm was prepared which comprises polyethylene at 100 mass % with ketjen black added at 5 mass %. The aforementioned adhesive A was coated to a thickness of 1 μm on one surface of the resin layer and a copper foil having a thickness of 2 μm was overlaid and adhered thereon as an ion blocking layer. One more resin layer was overlaid onto the surface of the copper foil side of the stacked body obtained and adhered by thermocompression bonding at 60° C., thereby fabricating a current collector comprising a resin layer, an adhesive layer, an ion blocking layer, and a resin layer.

The aforementioned positive electrode active substance slurry was coated onto a surface of the resin layer that adjoins the adhesive layer of the current collector obtained, and a positive electrode active material layer having a thickness of 36 μm was formed by pressing the coated slurry after drying it. Meanwhile, the aforementioned negative electrode active substance slurry was coated onto a surface of the resin layer that adjoins the ion blocking layer of the current collector, and a negative electrode active material layer having a thickness of 30 μm was formed by pressing the coated slurry after drying it, thus completing a bipolar electrode of FIG. 3E.

Working Example 6

As a resin layer having electrical conductivity, a film having a thickness of 7 μm was prepared which comprises polyethylene at 100 mass % with ketjen black added at 5 mass %. The aforementioned adhesive A was coated to a thickness of 1 μm on one surface of the resin layer and a copper foil having a thickness of 2 μm was overlaid and adhered thereon as an ion blocking layer. The aforementioned adhesive A was coated to a thickness of 1 μm on the surface of the copper foil side of this stacked body and one more resin layer was overlaid thereon and adhered. Using the same method as explained previously, the adhesive A, the copper coil, the adhesive A, and a resin layer were stacked successively on the surface of the resin layer side of the stacked body obtained so as to fabricate a current collector comprising a resin layer, an adhesive layer, an ion blocking layer, an adhesive layer, a resin layer, an adhesive layer, an ion blocking layer, an adhesive layer, and a resin layer.

The aforementioned positive electrode active substance slurry was coated onto one surface of the current collector obtained, and a positive electrode active material layer having a thickness of 36 μm was formed by pressing the coated slurry after drying it. Meanwhile, the aforementioned negative electrode active substance slurry was coated onto the other surface of the current collector, and a negative electrode active material layer having a thickness of 30 μm was formed by pressing the coated slurry after drying it, thus completing a bipolar electrode of FIG. 3F.

Working Example 7

As a resin layer having electrical conductivity, a film having a thickness of 20 μM was prepared which comprises polyethylene at 100 mass % with ketjen black added at 5 mass %. The aforementioned adhesive A was coated to a thickness of 1 μm on one surface of the resin layer and a copper foil having a thickness of 2 μM was overlaid and adhered thereon as an ion blocking layer. One more copper foil was overlaid onto the surface of the resin layer side of the stacked body obtained and adhered by thermocompression bonding at 60° C., thereby fabricating a current collector comprising an ion blocking layer, an adhesive layer, a resin layer, and an ion blocking layer.

The aforementioned positive electrode active substance slurry was coated onto a surface of the ion blocking layer that adjoins the adhesive layer of the current collector obtained, and a positive electrode active material layer having a thickness of 36 μm was formed by pressing the coated slurry after drying it. Meanwhile, the aforementioned negative electrode active substance slurry was coated onto a surface of the ion blocking layer that adjoins the resin layer of the current collector, and a negative electrode active material layer having a thickness of 30 μm was formed by pressing the coated slurry after drying it, thus completing a bipolar electrode of FIG. 3G.

Working Example 8

As a resin layer having electrical conductivity, a film having a thickness of 20 μm was prepared which comprises polyethylene at 100 mass % with ketjen black added at 5 mass %. The aforementioned adhesive A was coated to a thickness of 1 μm on one surface of the resin layer and a copper foil having a thickness of 2 μm was overlaid and adhered thereon as an ion blocking layer. One more copper foil was overlaid onto the surface of the resin layer side of the stacked body obtained and adhered by thermocompression bonding at 60° C., thereby fabricating a current collector comprising an ion blocking layer, an adhesive layer, a resin layer, and an ion blocking layer.

The aforementioned positive electrode active substance slurry was coated onto a surface of the ion blocking layer that adjoins the resin layer of the current collector obtained, and a positive electrode active material layer having a thickness of 36 μm was formed by pressing the coated slurry after drying it. Meanwhile, the aforementioned negative electrode active substance slurry was coated onto a surface of the ion blocking layer that adjoins the adhesive layer of the current collector, and a negative electrode active material layer having a thickness of 30 μm was formed by pressing the coated slurry after drying it, thus completing a bipolar electrode of FIG. 3H.

Working Example 9

As a resin layer having electrical conductivity, a film having a thickness of 25 μm was prepared which comprises polyethylene at 100 mass % with ketjen black added at 5 mass %. The aforementioned adhesive A was coated to a thickness of 1 μm on one surface of the resin layer and a copper foil having a thickness of 2 μm was overlaid and adhered thereon as an ion blocking layer, thereby fabricating a current collector comprising an ion blocking layer, an adhesive layer, and a resin layer.

The aforementioned positive electrode active substance slurry was coated onto the surface of the ion blocking layer side of the current collector obtained, and a positive electrode active material layer having a thickness of 36 μm was formed by pressing the coated slurry after drying it. The aforementioned negative electrode active substance slurry was coated onto the surface of the resin layer side of the current collector, and a negative electrode active material layer having a thickness of 30 μm was formed by pressing the coated slurry after drying it, thus completing a bipolar electrode of FIG. 3I.

Working Example 10

As a resin layer having electrical conductivity, a film having a thickness of 25 μm was prepared which comprises polyethylene at 100 mass % with ketjen black added at 5 mass %. The aforementioned adhesive A was coated to a thickness of 1 μm on one surface of the resin layer and a copper foil having a thickness of 2 μm was overlaid and adhered thereon as an ion blocking layer, thereby fabricating a current collector comprising an ion blocking layer, an adhesive layer, and a resin layer.

The aforementioned positive electrode active substance slurry was coated onto the surface of the resin layer side of the current collector obtained, and a positive electrode active material layer having a thickness of 36 μm was formed by pressing the coated slurry after drying it. The aforementioned negative electrode active substance slurry was coated onto the surface of the ion blocking layer side of the current collector, and a negative electrode active material layer having a thickness of 30 μm was formed by pressing the coated slurry after drying it, thus completing a bipolar electrode of FIG. 3J.

Working Example 11

As a resin layer having electrical conductivity, a film having a thickness of 20 μm was prepared which comprises polyethylene at 100 mass % with ketjen black added at 5 mass %. As an adhesive having a conductive quality and separate from the adhesive A, an adhesive B was prepared which comprises a denatured olefin (polyolefin based, melting point 120° C.) with carbon particles serving as an electrically conductive material added at 20 mass % and has had its viscosity adjusted using xylene. The aforementioned adhesive A was coated to a thickness of 1 μm on one surface of the resin layer and a copper foil having a thickness of 2 μm was overlaid and adhered thereon as an ion blocking layer. The aforementioned adhesive B was coated to a thickness of 1 μm on the other surface of the resin layer and a copper foil having a thickness of 2 μm was overlaid and adhered thereon as an ion blocking layer, thereby fabricating a current collector comprising an ion blocking layer, an adhesive layer (A), a resin layer, and adhesive layer (B), and an ion blocking layer.

The aforementioned positive electrode active substance slurry was coated onto a surface of the ion blocking layer that adjoins the adhesive layer (B) of the current collector obtained, and a positive electrode active material layer having a thickness of 36 μm was formed by pressing the coated slurry after drying it. Meanwhile, the aforementioned negative electrode active substance slurry was coated onto a surface of the ion blocking layer that adjoins the adhesive layer (A) of the current collector, and a negative electrode active material layer having a thickness of 30 μm was formed by pressing the coated slurry after drying it, thus completing a bipolar electrode of FIG. 3K.

Working Example 12

As a resin layer having electrical conductivity, a film having a thickness of 20 μm was prepared which comprises polyethylene at 100 mass % with ketjen black added at 5 mass %. The aforementioned adhesive A was coated to a thickness of 1 μm on one surface of the resin layer and an aluminum foil having a thickness of 2 μm was overlaid and adhered thereon as an ion blocking layer. The aforementioned adhesive B was coated to a thickness of 1 μm on the other surface of the resin layer and a copper foil having a thickness of 2 μm was overlaid and adhered thereon as an ion blocking layer, thereby fabricating a current collector comprising an ion blocking layer (Al), an adhesive layer (A), a resin layer, and adhesive layer (B), and an ion blocking layer (Cu).

The aforementioned positive electrode active substance slurry was coated onto the surface of the ion blocking layer (Cu) side of the current collector obtained, and a positive electrode active material layer having a thickness of 36 μm was formed by pressing the coated slurry after drying it. The aforementioned negative electrode active substance slurry was coated onto the surface of the ion blocking layer (Al) side of the current collector, and a negative electrode active material layer having a thickness of 30 μm was formed by pressing the coated slurry after drying it, thus completing a bipolar electrode of FIG. 3L.

Working Example 13

Other than using a 2-μm thick aluminum foil as an ion blocking layer, a bipolar electrode of FIG. 3M was completed using the same method as Working Example 4.

Working Example 14

Other than using a 2-μm thick diamond-like carbon (DLC) as an ion blocking layer, a bipolar electrode of FIG. 3N was completed using the same method as Working Example 4.

Working Example 15

Other than using a 12-μm thick film made of polyethylene terephthalate (PET) with ketjen black added at 5 mass % as a resin layer having electrical conductivity, a bipolar electrode of FIG. 3O was completed using the same method as Working Example 4.

Working Example 16

Other than using a 25-μm thick film made of polyethylene terephthalate (PET) with ketjen black added at 5 mass % as a resin layer having electrical conductivity, a bipolar electrode of FIG. 3P was completed using the same method as Working Example 9.

Working Example 17

Other than using a 20-μm thick film made of polyethylene terephthalate (PET) with ketjen black added at 5 mass % as a resin layer having electrical conductivity, a bipolar electrode of FIG. 3Q was completed using the same method as Working Example 7.

Comparative Example 1

A current collector comprising only a 20-μm thick film (resin layer having an electrically conductive property) made of polyethylene at 100 mass % with ketjen black added at 5 mass % was used.

The aforementioned positive electrode active substance slurry was coated onto one surface of the aforementioned current collector, and a positive electrode active material layer having a thickness of 36 μm is formed by pressing the coated slurry after drying it. The aforementioned negative electrode active substance slurry was coated onto the other surface of the current collector, and a negative electrode active material layer having a thickness of 30 μm was formed by drying and pressing the coated slurry, thus completing a bipolar electrode of FIG. 4A.

Comparative Example 2

As a resin layer having electrical conductivity, a film having a thickness of 25 μm was prepared which comprises polyethylene at 100 mass % with ketjen black added at 5 mass %. A copper foil having a thickness of 2 μm was overlaid onto one surface of the aforementioned resin layer as an ion blocking layer and adhered by thermal welding at 100° C. to fabricate a current collector comprising an ion blocking layer and a resin layer.

The aforementioned positive electrode active substance slurry was coated onto the ion blocking layer side of the current collector obtained, and a positive electrode active material layer having a thickness of 36 μm was formed by pressing the coated slurry after drying it. The aforementioned negative electrode active substance slurry was coated onto the surface of the resin layer side of the current collector, and a negative electrode active material layer having a thickness of 30 μm was formed by pressing the coated slurry after drying it, thus completing a bipolar electrode of FIG. 4B.

Comparative Example 3

As a resin layer having electrical conductivity, a film having a thickness of 25 μm was prepared which comprises polyethylene with ketjen black added at 5 mass %. An aluminum foil having a thickness of 2 μm was overlaid onto one surface of the aforementioned resin layer as an ion blocking layer and adhered by thermal welding at 100° C. to fabricate a current collector comprising an ion blocking layer and a resin layer.

The aforementioned positive electrode active substance slurry was coated onto the surface of the resin layer side of the current collector obtained, and a positive electrode active material layer having a thickness of 36 μm was formed by pressing the coated slurry after drying it. The aforementioned negative electrode active substance slurry was coated onto the surface of the ion blocking layer side of the current collector, and a negative electrode active material layer having a thickness of 30 μm was formed by pressing the coated slurry after drying it, thus completing a bipolar electrode of FIG. 4C.

Comparative Example 4

As a resin layer having electrical conductivity, a film having a thickness of 20 μm was prepared which comprises polyethylene at 100 mass % with ketjen black added at 5 mass %. An aluminum foil having a thickness of 2 μm was overlaid onto one surface of the aforementioned resin layer as an ion blocking layer and adhered by thermal welding at 100° C. A copper foil having a thickness of 2 μm was overlaid onto the other surface of the aforementioned resin layer as an ion blocking layer and adhered by thermal welding at 100° C. to fabricate a current collector comprising an ion blocking layer, a resin layer, and an ion blocking layer.

The aforementioned positive electrode active substance slurry is coated onto one surface of the current collector obtained, and a positive electrode active material layer having a thickness of 36 μm is formed by pressing the coated slurry after drying it. The aforementioned negative electrode active substance slurry was coated onto the other surface of the current collector, and a negative electrode active material layer having a thickness of 30 μm was formed by drying and pressing the coated slurry, thus completing a bipolar electrode of FIG. 4D.

Comparative Example 5

As a resin layer having electrical conductivity, a film having a thickness of 12.5 μm was prepared which comprises polyethylene at 100 mass % with ketjen black added at 5 mass %. An aluminum foil having a thickness of 2 μm was overlaid onto one surface of the aforementioned resin layer as an ion blocking layer and adhered by thermal welding at 100° C. One more resin layer was overlaid onto the surface of the aluminum foil side of the stacked body obtained and adhered by thermal welding at 100° C., thereby fabricating a current collector comprising a resin layer, an ion blocking layer, and a resin layer.

The aforementioned positive electrode active substance slurry is coated onto one surface of the current collector obtained, and a positive electrode active material layer having a thickness of 36 μm is formed by pressing the coated slurry after drying it. The aforementioned negative electrode active substance slurry was coated onto the other surface of the current collector, and a negative electrode active material layer having a thickness of 30 μm was formed by drying and pressing the coated slurry, thus completing a bipolar electrode of FIG. 4E.

An electrolytic solution was prepared by dissolving the lithium salt $LiPF_6$ at a concentration of 1.0 M in a PC-EC mixed solvent comprising propylene carbonate (PC) and ethylene carbonate (EC) mixed at 1:1 (volumetric ratio). The electrolytic solution obtained was mixed at 90 mass % with a host polymer comprising a mixture of hexafluoropropylene (HFP) and polyvinylidene difluoride (PVDF) (HFP:PVDF=90:10 (mass ratio)), and at 10 mass % of dimethyl carbonate (DMC) as a viscosity adjusting solvent, thereby preparing an appropriate amount of a gel electrolyte.

The aforementioned gel electrolyte was coated onto the positive electrode active material layer and the negative electrode active material layer of the aforementioned bipolar electrode and the DMC was dried to obtain a bipolar electrode having the gel electrolyte permeated therein. The gel electrolyte was also coated onto both sides of a separator (thickness: 20 μm) and the DMC was dried to fabricate a gel polymer electrolyte layer.

The gel polymer electrolyte layer was placed on the positive electrode active material layer of the aforementioned bipolar electrode and a seal section (made of epoxy resin) having a width of 12 mm was arranged around the bipolar electrode. After stacking six layers of such bipolar electrodes successively, a press was applied from above and below the seal sections (0.2 MPa, 160° C., 5 seconds) to weld and seal the single cell layers (five layers total).

The electric power generating element obtained was sandwiched between aluminum tabs (130 mm×80 mm, thickness 100 μm) serving as current leads and vacuum sealed using an aluminum laminate film as an exterior package material. This was then pressed using a thermal press machine at a pressure of 1 kg/cm2 and a heating temperature of 100° C. for one hour to cure the uncured seal section and complete the bipolar secondary battery.

Now an internal resistance test of the bipolar secondary batteries will be discussed. Each of the bipolar secondary batteries fabricated as explained above was charged to 21.0 V under an ambient atmosphere of 25° C. using a constant current method (CC, current: 0.5 mA) and, afterwards, charged using a constant voltage method (CV, 21 V) for a combined total of 10 hours charging. Afterwards, the batteries were discharged at a discharge capacity of 1 C. After this, the internal resistance of the battery was measured at 25° C. Next, the battery was heated to 130° C. and the internal resistance measured. Then, the internal resistance at 130° C. was calculated based on the assumption that the internal resistance at 25° C. was 1. The results are shown in Table 1.

Now a heat emission Amount test of the bipolar secondary batteries will be discussed. Each of the bipolar secondary batteries fabricated as explained previously was disassembled in a glovebox and the bipolar electrodes comprising a positive electrode active material layer, a current collector, and a negative electrode active material layer were separated, cleaned three times with DMC, and dried inside a vacuum chamber. Afterwards, the stacked bodies comprising a positive electrode active material layer and a current collector or stacked bodies comprising a negative electrode active material layer and a current collector were extracted 1 mg at a time. An electrolytic solution was prepared by dissolving the lithium salt $LiPF_6$ at a concentration of 1.0 M in an EC-DEC mixed solvent comprising EC and diethyl carbonate (DEC) mixed at 2:3 (volumetric ratio). The aforementioned extracted stacked bodies were placed in a gold plated stainless steel pan with the electrolytic solution and the amount of heat emitted due to an exothermic reaction between the active material layer and the electrolytic solution was measured using differential scanning calorimetry (DSC) in a range from an ambient temperature (25° C.) to 400° C. The results are shown in Table 1.

TABLE 1

| | Resin Layer | Adhesive Layer | Ion Blocking Layer | Structure | Heat Emission Amount [J/g] Negative Electrode | Heat Emission Amount [J/g] Positive Electrode | Internal Resistance Change |
|---|---|---|---|---|---|---|---|
| Working Example 1 | PE | Adhesive A | None | positive electrode + resin layer + adhesive layer + resin layer + negative electrode | 1098 | 956 | 5.3 |
| Working Example 2 | PE | Adhesive A | None | positive electrode + adhesive layer + resin layer + negative electrode | 1058 | — | 5.4 |
| Working Example 3 | PE | Adhesive A | None | positive electrode + resin layer + adhesive layer + negative electrode | — | 941 | 5.2 |
| Working Example 4 | PE | Adhesive A | Cu | positive electrode + resin layer + adhesive layer + ion blocking layer + adhesive layer + resin layer + negative electrode | 1085 | 969 | 5.3 |
| Working Example 5 | PE | Adhesive A | Cu | positive electrode + resin layer + adhesive layer + ion blocking layer + resin layer + negative electrode | 1079 | 963 | 5.1 |
| Working Example 6 | PE | Adhesive A | Cu | positive electrode + resin layer + adhesive layer + ion blocking layer + adhesive layer + resin layer + adhesive layer + ion blocking layer + resin layer + negative electrode | 1106 | 987 | 5.5 |
| Working Example 7 | PE | Adhesive A | Cu | positive electrode + ion blocking layer + adhesive layer + resin layer + ion blocking layer + negative electrode | 1395 | — | 5.0 |
| Working Example 8 | PE | Adhesive A | Cu | positive electrode + ion blocking layer + adhesive layer + resin layer + adhesive layer + ion blocking layer + negative electrode | — | 1125 | 5.0 |
| Working Example 9 | PE | Adhesive A | Cu | positive electrode + ion blocking layer + adhesive layer + resin layer + negative electrode | 1056 | — | 5.1 |
| Working Example 10 | PE | Adhesive A | Cu | positive electrode + resin layer + adhesive layer + ion blocking layer + resin layer + negative electrode | — | 951 | 5.1 |
| Working Example 11 | PE | (1) Adhesive A (2) Adhesive B | Cu | positive electrode + ion blocking layer + adhesive layer (A) + resin layer + adhesive layer (B) + ion blocking layer + negative electrode | 1388 | 1136 | 5.3 |
| Working Example 12 | PE | (1) Adhesive A (2) Adhesive B | (1) Cu (2) Al | positive electrode + ion blocking layer (Cu) + adhesive layer (A) + resin layer + adhesive layer (B) + ion blocking layer (Al) + negative electrode | 1399 | 1149 | 5.3 |
| Working Example 13 | PE | Adhesive A | Al | positive electrode + resin layer + adhesive layer + ion blocking layer + resin layer + negative electrode | 1090 | 976 | 5.1 |
| Working Example 14 | PE | Adhesive A | DLC | positive electrode + resin layer + adhesive layer + ion blocking layer + adhesive layer + resin layer + negative electrode | 1091 | 982 | 4.9 |
| Working Example 15 | PET | Adhesive A | Cu | positive electrode + resin layer + adhesive layer + ion blocking layer + adhesive layer + resin layer + negative electrode | 1086 | 961 | 4.9 |
| Working Example 16 | PET | Adhesive A | Cu | positive electrode + resin layer + ion blocking layer + adhesive layer + resin layer + negative electrode | 1031 | — | 4.9 |
| Working Example 17 | PET | Adhesive A | Cu | positive electrode + resin layer + adhesive layer + ion blocking layer + resin layer + negative electrode | 1388 | — | 4.9 |
| Comparative Example 1 | PE | None | None | positive electrode + resin layer + negative electrode | 1767 | 1593 | 1.8 |
| Comparative Example 2 | PE | None | Cu | positive electrode + resin layer + ion blocking layer + resin layer + negative electrode | 1745 | 1736 | 2.9 |
| Comparative Example 3 | PE | None | Al | positive electrode + resin layer + ion blocking layer + resin layer + negative electrode | 1896 | 1586 | 2.8 |
| Comparative Example 4 | PE | None | Cu | positive electrode + resin layer + ion blocking layer + negative electrode | 1936 | 1691 | 2.7 |
| Comparative Example 5 | PE | None | Cu | positive electrode + resin layer + ion blocking layer + resin layer + negative electrode | 1773 | 1576 | 2.6 |

The results of Table 1 demonstrate that the internal resistance increases more markedly as the temperature increases in Working Examples 1 to 17 than in Comparative This is believed to be due to the expansion material vaporizing in the thermally expandable microcapsules of the adhesive layers as the temperature increases and causing the adhesive layer to expand in a thickness direction (stacking direction). Also, the amount of heat emitted in an exothermic reaction between the electrolyte and the positive electrode active substance and/or the negative electrode active substance is markedly lower in Working Examples 1 to 17 than in Comparative Examples 1 to 5. This is thought to be due to the amount of current flowing in the thickness direction (stacking direction) of the current collector decreasing as the internal resistance increases.

The invention claimed is:

1. A bipolar secondary battery current collector for a bipolar secondary battery comprising:
    an electrically conductive section; and
    an expansion section that expands in a thickness direction of the bipolar secondary battery current collector and increases an internal resistance of the battery during a period when heated within a range from 25° C. to 130° C., wherein
    the expansion section includes a thermally expandable microcapsule comprising an expansion material enclosed in a gel containing a thermoplastic macromolecular material.

2. The bipolar secondary battery current collector as recited in claim 1, wherein
    the electrically conductive section comprises a polymer material.

3. The bipolar secondary battery current collector as recited in claim 1, wherein the electrically conductive section is at least partially formed by a resin layer having electrical conductivity; and
    the expansion section is at least partially formed by an adhesive layer having electrical conductivity, the adhesive layer having a lower melting point than the resin layer, the resin layer and the adhesive layer being layered in the thickness direction of the bipolar secondary battery current collector.

4. The bipolar secondary battery current collector as recited in claim 3, further comprising
    an ion blocking layer with one surface of the adhesive layer and one surface of the ion blocking layer being joined to each other.

5. The bipolar secondary battery current collector as recited in claim 4, further comprising
    two resin layers that are arranged on a second surface of the ion blocking layer and a second surface of the adhesive layer, respectively.

6. A bipolar secondary battery electrode including the bipolar secondary battery current collector as recited in claim 1, the bipolar secondary battery electrode comprising:
    a positive electrode active material layer formed on a first surface of the current collector; and
    a negative electrode active material layer formed on a second surface of the current collector.

7. A bipolar secondary battery including the bipolar secondary battery electrode recited in claim 6, the bipolar secondary battery comprising:
    an electric power generating element comprising a plurality of electrolyte layers stacked in-between the bipolar secondary battery electrode and at least one additional bipolar secondary battery electrode.

8. A bipolar secondary battery electrode including the bipolar secondary battery current collector as recited in claim 5, the bipolar secondary battery electrode comprising:
    a positive electrode active material layer formed on a first surface of the current collector; and
    a negative electrode active material layer formed on a second surface of the current collector.

9. A bipolar secondary battery including the bipolar secondary battery electrode recited in claim 8, the bipolar secondary battery comprising:
    an electric power generating element comprising a plurality of electrolyte layers stacked in-between the bipolar secondary battery electrode and at least one additional bipolar secondary battery electrode.

* * * * *